(12) United States Patent
Xu et al.

(10) Patent No.: US 8,196,218 B2
(45) Date of Patent: Jun. 5, 2012

(54) SYSTEM AND METHODS FOR CONTROLLING PROPERTIES OF NANOJUNCTION DEVICES

(75) Inventors: Bingqian Xu, Athens, GA (US); Fan Chen, Seattle, WA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 535 days.

(21) Appl. No.: 12/414,069

(22) Filed: Mar. 30, 2009

(65) Prior Publication Data

US 2009/0249522 A1 Oct. 1, 2009

Related U.S. Application Data

(60) Provisional application No. 61/041,289, filed on Apr. 1, 2008.

(51) Int. Cl.
*G01Q 60/40* (2010.01)
(52) U.S. Cl. ............ 850/41; 850/10; 850/52; 324/693; 324/661; 324/664; 324/425; 204/556; 204/547
(58) Field of Classification Search .............. 850/10, 850/52, 41; 324/693, 661, 664, 425; 204/556, 204/547
See application file for complete search history.

(56) References Cited

U.S. PATENT DOCUMENTS 6,737,286 B2 5/2004 Tao et al.
7,132,837 B1 * 11/2006 Tao .............................. 324/693

OTHER PUBLICATIONS

Jang, et al., "Interpretation of stochastic events in single molecule conductance measurements", *Nano Lett.* 6(10),2362-7 (2006).
Li, et al, "Conductance of single alkanedithiols: conduction mechanism and effect of molecule-electrode contacts", *J. Am, Chem. Soc.*, 128(6)2135-41 (2006).
Lindsay and Ratner, "Molecular transport junctions: Clearing mists", *Advanced Materials*, 19: 23-31 (2007).
Muller, "Effect of the atomic configuration of gold electrodes on the electrical conduction of alkanedithiol molecules", *Phys. Rev. B*, 73(4), 045403-1-6 (2006).
Ulrich, et al., "Variability of conductance in molecular junctions", *J. Phys. Chem. B.* 110(6):2462-6 (2006).
Xu, "Modulating the conductance of a Au-octanedithiol-Au molecular junction", *Small*, 3(12):2061-5 (2007).
Xu, et al., "Measurement of single-molecule resistance by repeated formation of molecular junctions", *Science*, 301(5637):1221-3 (2003).

* cited by examiner

*Primary Examiner* — Jack Berman
*Assistant Examiner* — Meenakshi Sahu
(74) *Attorney, Agent, or Firm* — Pabst Patent Group LLP

(57) ABSTRACT

An exemplary, highly integrated, SPM-based system for measuring the conductivity and/or force of substance under programmable engaging/stretching processes is described. A sample bias is applied across two electrodes. A substance to be measured is sandwiched between them. A first electrode is first brought relative to a second electrode (engaging) in programmable pathways that can be described as stretching distance versus time curves. The process of engaging the electrodes continues until a certain current reached, a certain force reached and whichever case happens first. The electrodes are then separated (stretching) in programmable pathways that can be described as stretching distance versus time curves. A periodic modulation can be applied to the engaging/stretching process to realize different stretch pathways. The sample bias across the electrodes is kept constant or swept in a programmable shape over time, described as a voltage-versus time curve. The conductivity, engaging/stretching distance, and/or force are measured simultaneously.

21 Claims, 13 Drawing Sheets

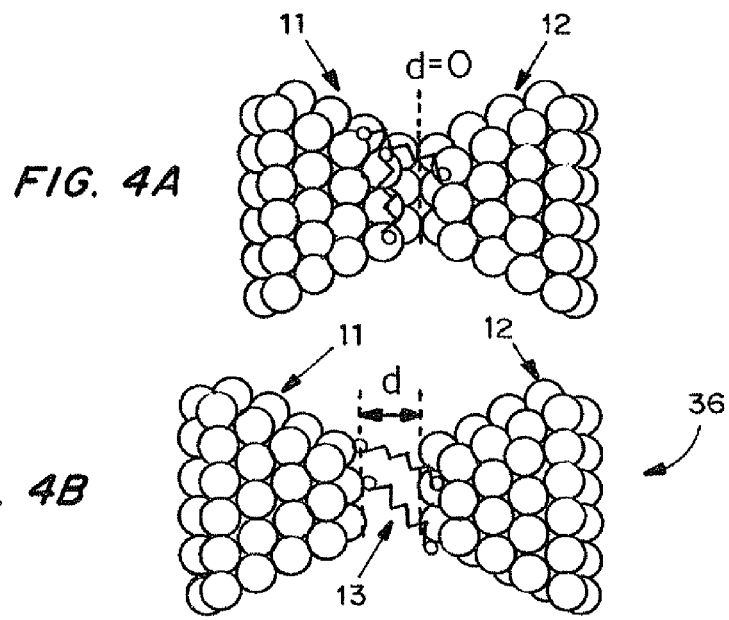
FIG. 4A
FIG. 4B
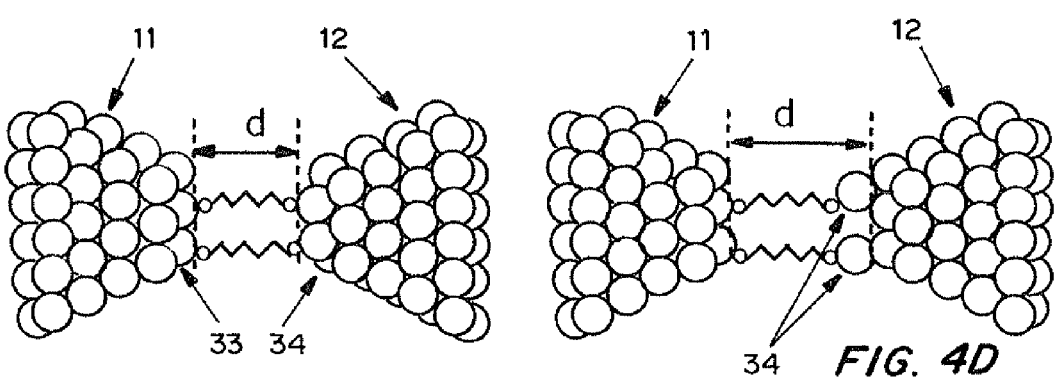
FIG. 4C
FIG. 4D
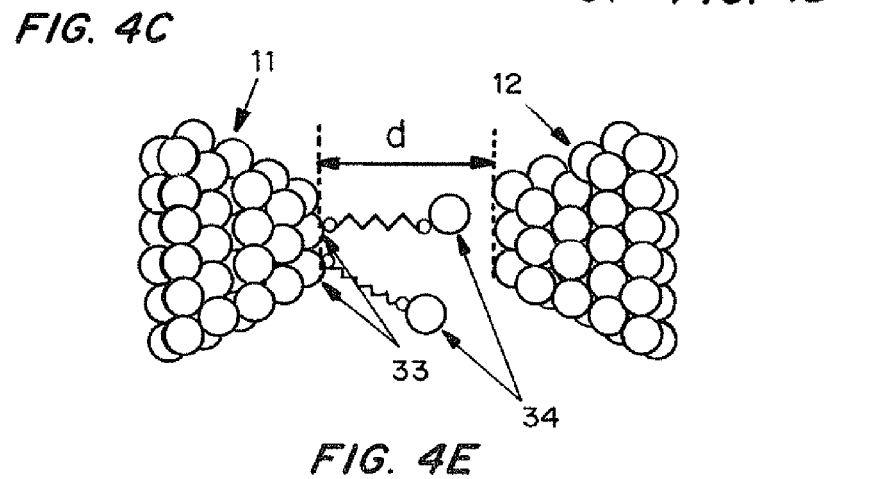
FIG. 4E

SYSTEM AND METHODS FOR CONTROLLING PROPERTIES OF NANOJUNCTION DEVICES

CROSS REFERENCE TO RELATED APPLICATION

This application claims benefit of and priority to U.S. provisional application No. 61/041,289 filed on Apr. 1, 2008, and where permissible is incorporated by reference in its entirety.

FIELD OF THE INVENTION

The present invention relates generally to an apparatus and methods for measuring the conductivity and force of a molecule, nanowire, cell, nano-bio interfaces, and other nanostructures.

BACKGROUND OF THE INVENTION

The fundamental understanding of electron transport in individual molecules wired between two metal electrodes is one of the key focuses in molecular electronics due to its potential applications in molecular computers and future bio-nanoelectronics. Due to the small sizes of single molecules, it has been difficult to obtain single molecule conductivities. Only recently, several critical technical approaches for forming stable metal-molecule-metal junctions have become possible and the conductivity of a series of molecules has been reported. These approaches are, for example, conducting probe atomic force microscopy (CP-AFM), nanopores, mercury-drop junctions, electromigrated break junctions, mechanically controllable break junctions, and scanning tunneling microscopy based break junction (STMBJ). Among them, the STMBJ was the latest one reported but has been widely used ever since its invention.

The STMBJ technique has several advantages. First, the target molecule is not required to be inserted in a less conductive matrix. For example, CP-AFM requires the target molecule to be inserted into a less conductive matrix so that one end of the molecule can be chemically bonded to the conductive substrate and the other end is facing up to provide a bonding site to the second electrode, i.e., the scanning probe microscope tip. This is often difficult for molecules that have complicated geometries or those that do not have a suitable less conductive matrix environment. STMBJ does not have this limitation. The molecules for STMBJ measurement can be protruding up from the substrates in a condensed monolayer, in clusters, or a single molecule scattering on the substrate surfaces. Second, STMBJ can be conducted in several environments. The STMBJ measurement can be carried out in vacuum, air, insulating liquid and conductive liquid environment. Third, the molecular conductivity generated by STMBJ is the closest one to theoretical approaches and is more convincing. That is because the conductivity is measured only when the molecules are bridged between the electrodes and stretched in full length. In STMBJ, bridged molecules are separated from other non-bridged molecules and the two electrodes are separated far enough so that direct tunneling current is negligible. Therefore, the measured current is mostly from the through-molecule current that reflects the real molecule conductivity. Finally, owning to the STMBJ's simple geometry that is only composed of target molecule and metal electrodes, it is easier for theorists to build models to perform theory studies.

STMBJ measures the conductivity mainly in the stretching process as a function of time elapsed or stretching distance. The terraces or plateaus in the conductivity-versus-stretch distance curves are attributed to current through bridged molecules. The conductance histogram from such terraces shows a series of peaks appearing at the integer multiples of a fundamental value that was used to identify single molecule conductivity.

In the initial studies, there was only one set of histogram peaks reported. However, recent approaches have revealed that there are multi-set peaks. Each set can deduce a single molecule conductivity that has a variation of 1~10. This significant difference raises a fundamental issue of molecule junctions, the contact/geometry effects, which have been well accepted to account for the observed multi-set peaks. The role of the electrode-molecule contacts and the specific geometry in molecular junctions has been the least controllable aspects of the experiments and proper methods for a detailed study and further investigations are highly needed.

In traditional STMBJ technique, the conductivity is measured during a continuous stretching of the molecular junction, which produces continuous modification on the contact configurations and subsequently could complicate the conductivity measurements. Therefore, it is still a big challenge to separate the influences of the stretching movement of the electrode from real conductivity. From the point of retrieving real molecule conductivity, an ideal measurement should be carried out under static or quasistatic electrode configurations to avoid motion caused contact or changes in geometry. Introducing additional motion into the stretching and/or engaging process can be an effective way to modulate or disturb the junction geometry/contact so that more details can be obtained about the molecule junction system's stability and other information.

Modulation can also be introduced to the sample bias applied across the electrodes to provide a desired electric field that is very useful to study substances with dielectric responses, for example, nano-particles and biological samples. This can yield numerous new applications.

Finally, simultaneous measurement of conductance and force can give information on both electronic and mechanical properties of both the junction system and the measured substance. It can shed more light onto the contact/geometry effects. A similar existing technique is the current sensing atomic force microscope (CS-AFM) based breakjunction (CSAFM-BJ). Although this technique measures both force and conductivity during the stretching process, it uses only the deflection/force as feedback to control the engaging process. Compared to current-feedback, the disadvantage of deflection/force feedback is lack of contact sensitivity especially when AFM tips with a high spring constant are used. By using current as feedback, the sensitivity can be greatly enhanced due to the exponential dependence of the tunneling current over electrode-sample separation.

A major reason that current CSAFM-BJ is not using current as feedback is due to a frequent exception that the current may disappear during normal measurements. Once that happens, the system looses feedback control and in most cases will result to CSAFM tip crashes.

Thus, there is a need for a highly integrated system as well as an effective method to systematically investigate the electronic and mechanical properties of molecule junctions as well as that of the molecule itself.

It is an object of the invention to provide systems and methods for measuring properties of junctions in nanodevices.

SUMMARY OF THE INVENTION

A highly integrated system for measuring conductivity and/or force of molecules bridged between a first and a second electrode is provided. The first and second electrodes are brought together and separated in programmable motion pathways. A conductivity measurement device is inserted to measure conductivity.

Another embodiment provides a method for measuring conductivity and/or force of molecules bridged between a first and a second electrode. The first and second electrodes are brought together and separated according in programmable motion pathways. Simultaneous conductivity and force measurements are conducted during the whole process.

A method for measuring conductivity and/or force of molecules bridged between a first and a second electrode is also provided. The sample bias applied across the two electrodes is swept in programmable pathways. Simultaneous conductivity and/or force measurements are conducted during the whole process.

Still another embodiment provides a method for studying electrode configuration/geometry effects in molecule junctions.

Another embodiment provides a dual-mode system that can automatically switch between two modes to ensure high contact sensitivity and meanwhile avoid tip-crashing.

BRIEF DESCRIPTION OF THE DRAWINGS

FIGS. 4a-4e illustrate graphical representations of the formation and breaking of molecule junction with increasing stretching distance.

DETAILED DESCRIPTION OF THE INVENTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Molecular electronics has been one of the hottest areas of nanotechnology because devices made of single molecules can be as small as a few nanometers and can have numerous potential applications in next generation computing. A fundamental step for molecular electronics is to determine the conductivity at single molecule levels. Among the recent technique approaches, scanning tunneling microscopy breakjunction (STMBJ) is one of the most important ones. An emerging interest of recent studies in STMBJ is the multi-set of fundamental peaks in conductivity histograms that have been attributed to contact effect in the molecule junctions. Therefore, a highly integrated system and method to allow systematic investigation of the conductivity and mechanical properties of molecular junctions is of great importance by quantifying the contact effect.

Considering the fact that the contact effect can not be studied separately, one of the most important approaches is to tune the molecule junctions and simultaneously measure the conductivity and/or force changes as a response to these interruptions. The formation and breaking of molecule junctions under programmable modulations are described.

Figure 1:
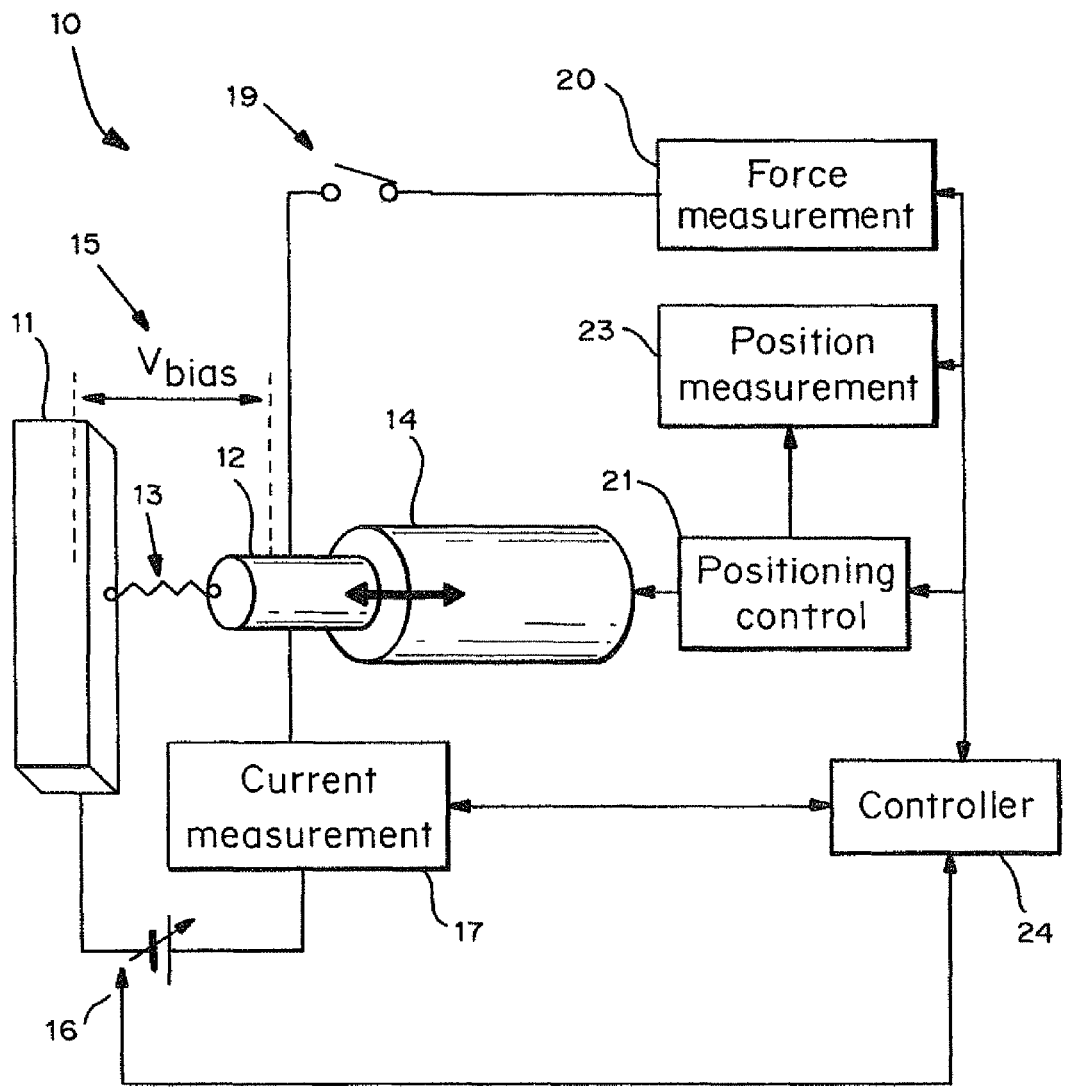
FIG. 1 is an illustration of an exemplary embodiment of an apparatus for measuring properties of junctions in nanodevices.

In FIG. 1, an exemplary highly integrated scanning probe microscopy breakjunction system (SPM-BJ) 10 that measures conductivity and/or simultaneous force is shown. A molecular junction is composed of a first probe electrode 11, a certain number of target molecules of substance 13, and a second probe electrode 12. In one embodiment, electrode 11 is a substrate and electrode 12 is mounted on one end of a precise positioning stage (PPS) that in one embodiment is a piezo 14. Piezo 14 is controlled by a programmable positioning control unit 21. In one embodiment, positioning control unit 21 is a data acquisition (DAQ) card installed in a computer. A programmable sample bias 15 from a voltage source 16 is applied across electrodes 11-12. As will be explained, the sample bias from voltage source 16 can be a constant value or can be modulated during the stretching process. A current/conductivity measurement device 17, which in one embodiment is composed of a preamplifier that converts current to voltage and a voltage measurement device, is inserted in the electrode circuit. The current/conductivity measurement result is directed to a controller 24. Simultaneous force measurement device 20 can be turned on and off by a switch 19. The relative position of electrode 12 as read from positioning control device 21 is recorded by a positioning measurement device 23. In one embodiment, the measurement devices in 17, 20, 23 are different data acquisition modules in a digital oscilloscope or different A/D channels of one or more multi-functional DAQ card(s).

Controller 24 controls the whole measuring system. In one embodiment, controller 24 is a computer equipped with one or more multi-functional DAQ card(s) and a set of control programs. Controller 24 receives the measured conductivity, force and position information. Controller 24 defines the output of the positioning control 21 in pre-defined pathways that will be explained in following sessions. Controller 24 determines the sample bias 15 from the voltage source 16 across the electrodes 11-12. Controller 24 defines and determines the contact criteria during the engaging process.

The basic mechanical motion part of SPM-BJ measurement is a repeated circle in which the controller 24 brings the two electrodes 11-12 together and subsequently separates them a certain distance. The former is also called "engage/ engaging" while the latter is called "stretch/stretching". For the systematic study of the contact effect of molecule junctions, motion controls should be performed not only in the stretching process, but also in the engaging process. A "controlled engaging" means that the pathways that the electrodes 11-22 are brought into contact are controlled. The engaging process can be stopped when one or more physical parameters reach thresholds, i.e., set-points. In one embodiment, two control parameters are used dependently or independently to tune the contact strength during the engaging process. In another embodiment, the engaging process is run in a feedback controlled step-by-step mode that can be described as a loop cycle that includes: (1) engaging the tip one step, (2) reading the control parameter value, and (3) comparing this value to the threshold. (4) If the control parameter value is, in one embodiment, equal to or greater than the threshold, the controller 24 stops engaging. (5) If the judgment in (4) is false, the controller 24 repeats (1)~(3) till the control parameter value is equal to or greater than the threshold.

Figure 2:
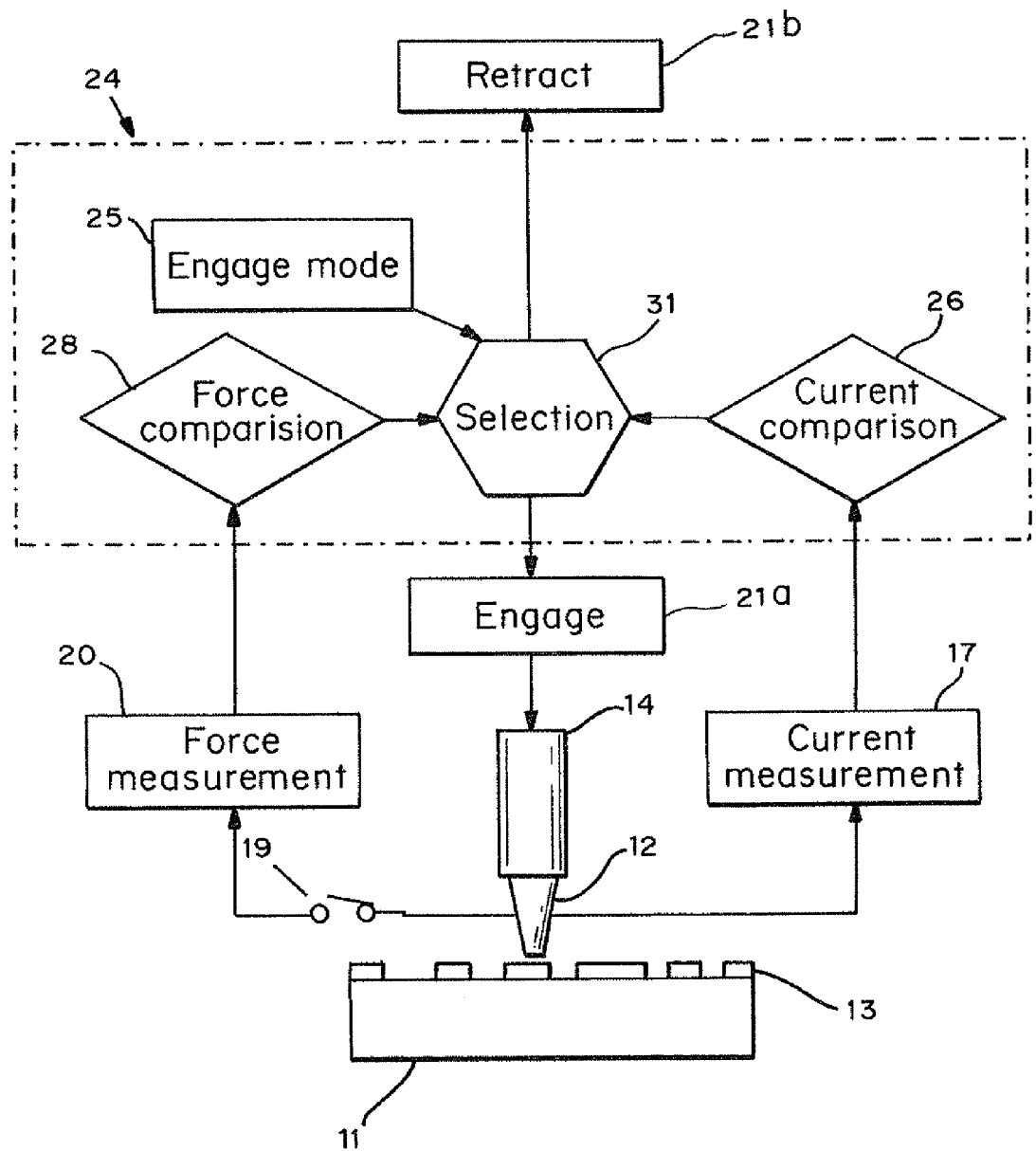
FIG. 2 is an illustration of a dual-mode SPM breakjunction system that simultaneously measures molecule conductivity and force. This system can automatically switch between current-feedback and force-feedback mode.

A diagram of an exemplary highly integrated system 10 during a feed-back controlled engaging process is shown in FIG. 2. In one embodiment, the control parameter(s) can be current and/or force. The controller 24 collects the measurement values from either current 17 or force 20 (or both current 17 and force 20) measurement. The force measurement 20 is only performed when the switch 19 is on. According to the engage mode selection 25, controller 24 first compares the collected value(s) with pre-define threshold(s) 26-28. According to the comparison result(s), the controller 24 determines next step in positioning control 21. If the control parameter value is equal to or larger than the threshold, the controller 24 continues engage 21a; on the reverse side, the controller 24 stops engaging and turns to stretching process 21b as will be explained in detail.

The engage mode 25 accepts inputs from users and determines which control parameter will be used for engage feedback control. The engage mode using force and current as feedback parameter leads to "force-feedback" and "current-feedback" mode, respectively. In one embodiment, the control parameter is only the force. The controller 24 makes a decision based only on the force comparison 28 result. The purpose of force-feedback is to control mechanical contact strength at the end of engaging.

In another embodiment, the control parameter is only the current. The controller 24 makes a decision only based on the current comparison 26 result. The purpose of using current as control parameter is to tune electric contact strength at the end of engaging. There are a few advantages of using current over using force as control parameter. First, the current is more sensitive to electrode-sample (11-13 or 12-13) or electrode-electrode (11-12) separation and therefore the positioning control 21 will have higher distance sensitivity. Second, as a direct benefit of the first advantage, reliable electric contact between the electrode 12 and the sample 13 can be obtained under as small as necessary mechanical force. This is important in many cases when users want to minimize the modification caused by breakjunction measurement or to protect the tip from damaging or aging. Third, according to the conductivity variation of the measured samples, controller 24 can automatically tune the mechanical force to ensure electric contact at the end of engaging process.

In another embodiment, controller 24 does both comparisons and it stops engaging as soon as whichever of the two control parameter values is first equal to or larger than the corresponding setpoint. As an example of this embodiment, system 10 can run mainly in current feedback mode to yield higher sensitivity; if the current disappears during the measurement for some reasons, system 10 can automatically turn to force feedback mode to protect the tip from crashing; when the current resumes, system 10 can return to current feedback mode automatically.

Figure 3A:
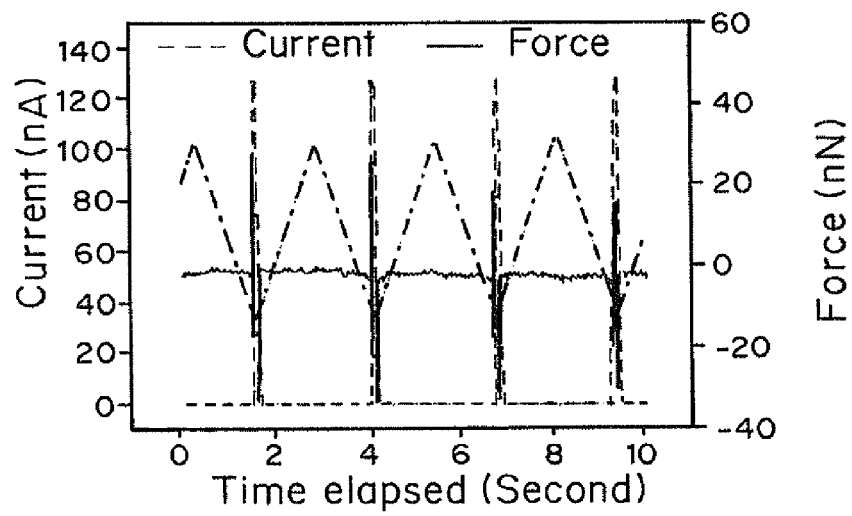
FIGS. 3a-3c are graphs illustrating simultaneously measured current, force and stretching distance in current-feedback mode and graphs illustrating automatic mode switching from current-feedback to force-feedback and in reverse direction.
Figure 3B:
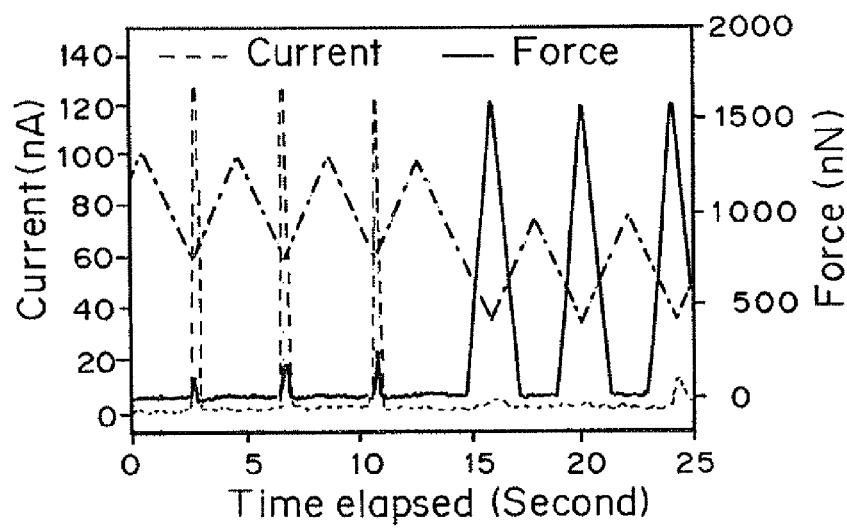
Figure 3C:
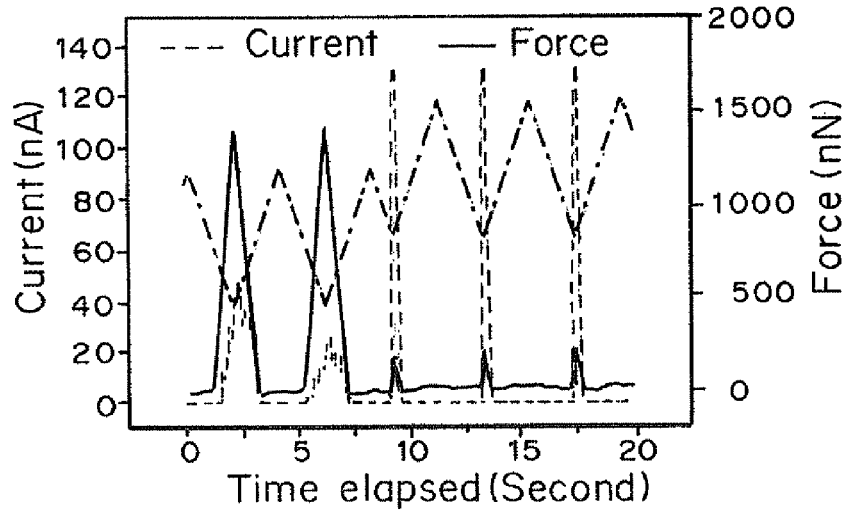

Illustrated in FIGS. 3a-c are simultaneously measured current (red lines, left y-axis), force (blue lines, right y-axis), and stretching distance (black line, y-axis not shown) in the embodiment of a combined feedback mode. The substance 13 is 1,8 octanedithiol (C8dithiol) molecule. The sample bias from voltage source 16 across the electrodes 11-12 was 0.2V. The current setpoint for all figures is 90 nA. A force, 1600 nN, was defined as force threshold for FIGS. 3a and 3b. A 1400 nN force threshold was defined for FIG. 3c. In this embodiment, the stretching distance is represented by a piezo voltage. The going-down part of the piezo voltage corresponds to engaging electrode 12 towards electrode 11. In the reverse direction, the rise-up of the piezo voltage corresponds to the stretching of electrode 12 from electrode 11. Each repeated cycle in the piezo voltage (black line) represents a cycle of breakjunction measurement.

Reliable electric contact under relative small mechanical force was obtained for each cycle in FIG. 3a. The engage processes were stopped immediately after the current rose up above the current setpoint. The horizontal parts of the force (blue line) represent non-contact regions. The force signal was observed to drop first and then rise up slightly after the contact point. The required force is automatically tuned from 16~29 nN to get current larger than the current setpoint.

The graph in FIG. 3b illustrates the process that the controller 24 automatically switches from current feedback to force feedback mode when current disappears during the measurement. For the first three cycles, forces from 120 to 176 nN were applied to obtain large current above the setpoint, 90 nA. Starting from the $4^{th}$ cycle, the monitored current was smaller than 20 nA even after relative large force (hundreds of nN) compared to those in the first three cycles was applied. The controller 24 continued to engage the tip 21a till the force reaches the force threshold, 1600 nN. Then the controller 24 stopped engaging and turned into the retracting process 21b. There were still no significant current in the following cycles. The engage processes were stopped when the forces reached the force threshold 1600 nN, which is equivalent to using force as feedback parameter with a 1600 nN setpoint.

FIG. 3c shows a reverse feedback mode switch from force-feedback to current-feedback when large tunneling current resumes. In the first two cycles (FIG. 3c), the tunneling current was low so that the engage stage was stopped when the force reaches the force threshold, 1400 nN. From the $3^{rd}$ cycle, large current was observed, which triggered the stop of the engage stages at much lower force, 110~200 nN. In other words, the system resumed the "current-feedback" mode.

FIGS. 4a-4e schematically illustrate controlled separation of molecule junctions. The stretch distance d is increased or tuned as predefined route that can be described as functions of stretching time. In FIG. 4a, electrode 11 is brought into physical contact with electrode 12. In one embodiment, both electrodes 11-12 are gold and the current measurement device 17 is composed of a preamplifier and a voltage measurement device. A saturated current is used to confirm this physical contact. The stretch distance d of electrode 12 relative to electrode 11 is calibrated to zero at the beginning of the stretching process.

In FIG. 4b, electrode 12 is separated gradually from electrode 11. A nano-gap is formed between electrodes 11-12. The real gap width is unmeasurable and it in most cases is different from the stretching distance d because the electrode atom can relax or reconstruct to its minimum energy conformation. A number of target molecules of substance 13 could bridge the two electrodes. In one embodiment, the target molecules have thiol groups on both ends which can be chemically bonded to the gold electrodes to from a metal-molecule-metal junction. In the early stretch stage, two different current components could be produced in the molecule junction, the direct tunneling current between electrode 11-12 and the through-molecule current. The current measurement device 17 cannot distinguish one from the other. Fortunately, the former component, direct tunneling current, dominates the total current at small gap width, but it decreases exponentially with the increase of gap width. The latter component, the through-molecule current, does not significantly change with the gap width as long as it is bridged between two electrodes. Therefore at the scale of full-stretched molecule length, typically a few nanometers, the direct tunneling current is negligible as compared to the through-molecule current.

With further stretching of electrode 12, in other words, with increase of the stretching distance d, bridged molecules of a substance are fully stretched as shown in FIG. 4c. At this point, metal atoms of the electrodes may reconstruct or slide to release the stress induced from the stretch motion as illustrated in FIG. 4d. The bonded metal atoms 33-34, in one embodiment are gold atoms, and possibly with their close neighbors are moved away from their original positions, but still remain physical contact with rest electrodes 11-12. Such electrode atom reconstruction or sliding with bridged molecule(s) will result in terraces in current-versus-stretching distance curves. FIG. 4e illustrates the case that further stretching will cause the molecule junction to break, in the shown case the electrode atoms on electrode 12 break. The current across the electrodes 11-12 will drop from the terrace to a lower value when molecule junctions break.

Continued stretching will eventually break all bridged junctions and lead to zero current or zero conductivity. The last non-zero terrace corresponds to one single molecule bridged between electrodes 11-12. The second non-zero terrace corresponds to two single molecule bridged. Other number of bridged molecules can be deduced in the same way. Recent work has demonstrated that there are significant variations in the conductivity or current of the same number of non-zero terraces. Some pioneering work suggested that these variations are correlated with the contact geometry of the metal electrode atoms 33-34 and their close neighbors. Therefore, it is of great importance to understand the contact geometry and its effect on single molecule conductivities. Certain embodiments describe to introduce artificial motion into the stretching process and record the responses, in one embodiment are current and force, from the molecule junctions.

In one embodiment, the stretching behavior is described as stretching distance-versus-stretch time curves ("stretch curve" or "stretching curve"). The stretching behavior can be a basic stretching 37 or a basic stretching 37 plus a multi-level periodic modulation 39. A basic stretching 37 can be represented as a curve from point "A" to point "B" in the distance-versus-stretch time (d-time) curves as shown in FIGS. 5a-d. In one embodiment, point "A" corresponds to zero stretching distance 35 and point "B" corresponds to a larger stretching distance 36. The paths from point A 35 to point B 36 can be any pathway. Some of the basic stretching paths are illustrated in FIGS. 4a-4d. In one embodiment, each stretching behavior is an array of piezo voltage that will be outputted in sequence by controller 24 to drive the piezo 14 and the electrode 12 away from electrode 11.

Figure 5A:
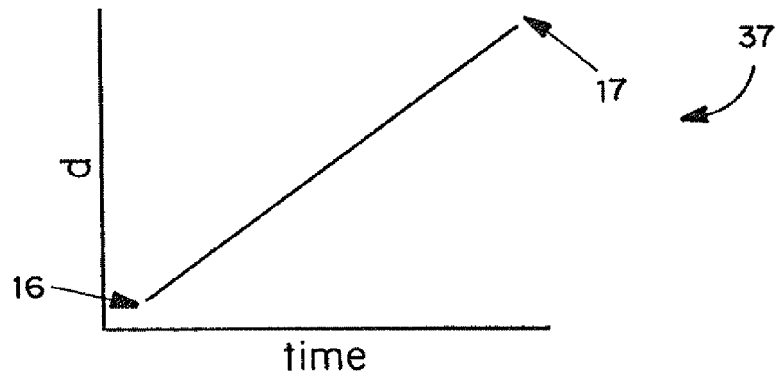
FIGS. 5a-5d are graphs illustrating different basic stretching processes as represented by stretching distance-versus-stretching time curves.
Figure 5B:
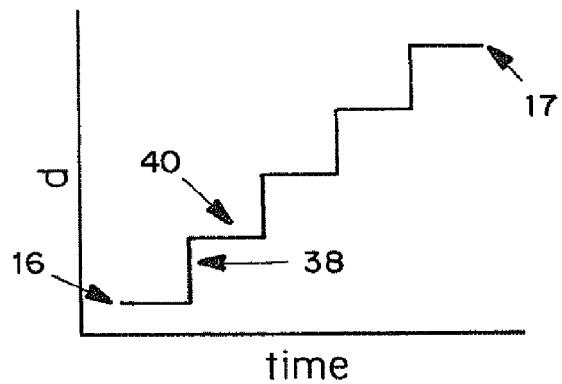

FIG. 5a illustrates a straight line in the stretching distance d-versus-stretching time "time" curve 37 from distance 35 to distance 36. This straight line represents a linear stretching behavior with constant stretching speed, which is used in existing breakjunction systems. FIG. 5b illustrates a stair-up shape stretching curve. Each stretch cycle is composed of a sharp increase 40 in stretching distance and a horizontal line where the stretching distance is kept constant. This curve corresponds to a stretch-and-hold behavior, in which the positioning control device 21 first stretches electrode 12 a short distance 40, and then maintains this distance for a pre-defined time period 38. The purpose of such a stretching mode includes first introducing a sharp interruption to the molecule junction and secondly waiting to allow observation of contact relaxation.

Figure 5C:
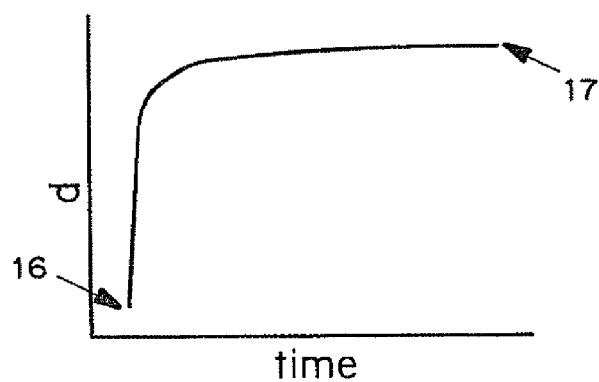

Illustrated in FIG. 5c is a parabolic shape stretching curve. The stretch behavior in this embodiment has a fast initial stretching speed that gradually decreases to zero, in practice, to a close zero value. The stretching speed is the slope of the stretching distance-versus-time curve.

Figure 5D:
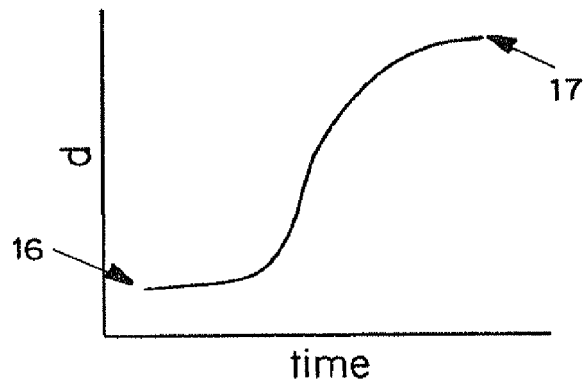

As shown in FIG. 5d, the stretching distance curve 37 can be a hand-drawing curve from a starting distance 35 to an ending distance 36. Such hand-drawing curves provide users more freedom in defining stretching behaviors. A home-made program is used to convert such drawing curve into retract array. In the embodiment as shown in FIG. 5d, a continuous changing stretching speed varies in a slow-fast-slow mode to allow smooth speed-up from zero speed and speed-down to close zero speed. The purpose is to avoid sudden start or stop of electrode 12 to provide smooth stretching.

Figure 6A:
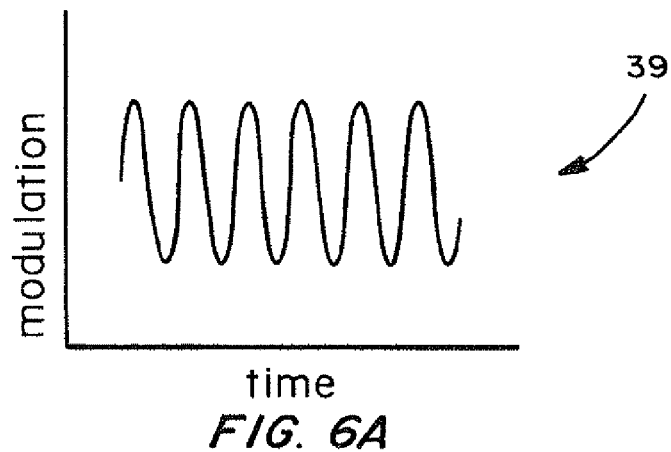
FIGS. 6a-6e are graphs showing different modulations that can be applied to the basic stretching processes.
Figure 6B:
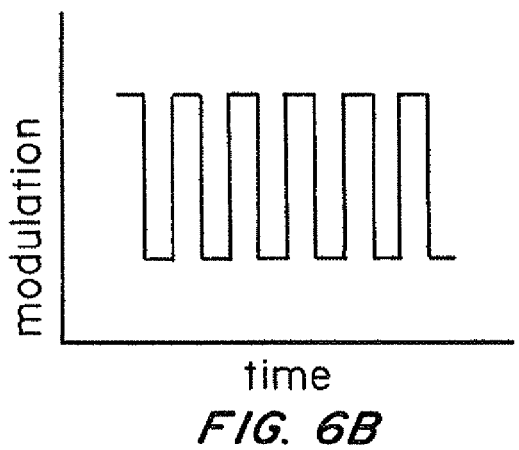
Figure 6C:
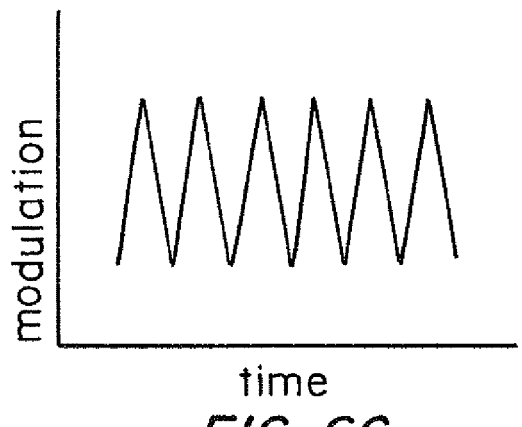
Figure 6D:
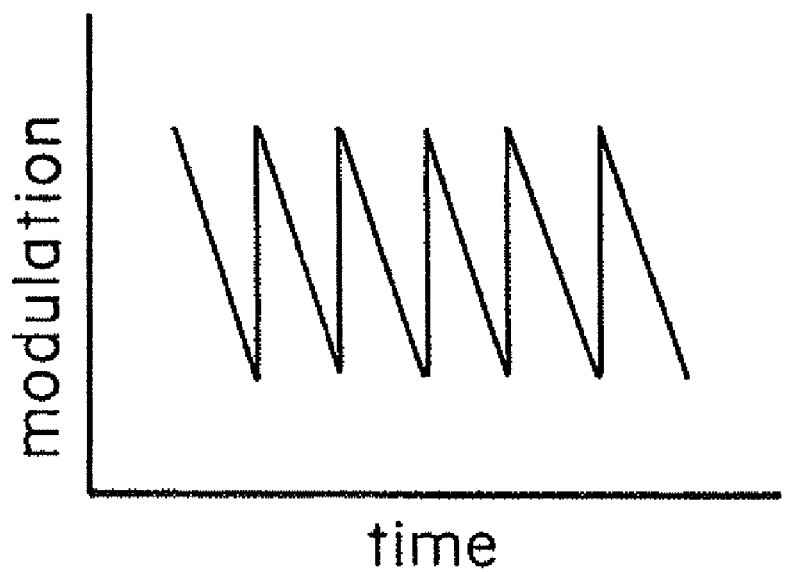
Figure 6E:
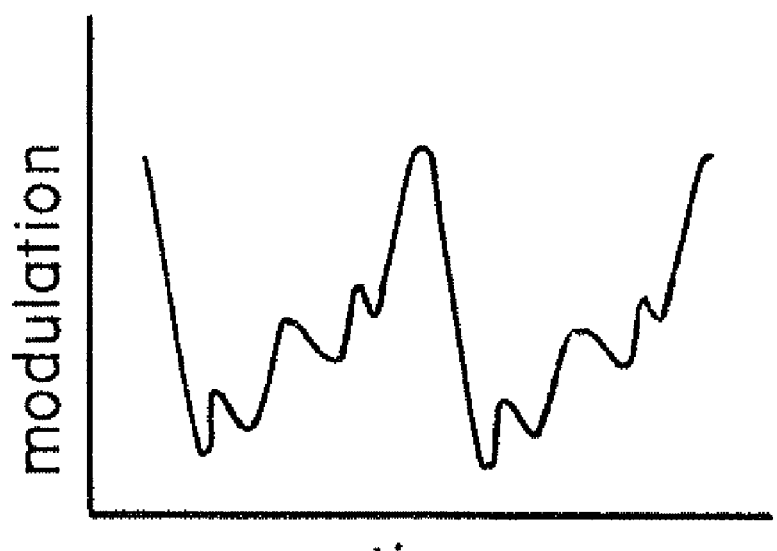

A second part of stretching behavior is a modulation 39 that can be a periodic or irregular waveform. The purpose of a modulation is to provide periodic or irregular tuning on the contact part of molecular junctions. In most cases, the amplitude of such modulation is relatively small in order to cause metal electrode atom reconstruction or sliding rather than breaking the junction. However, in some other embodiments, the amplitude of modulation can be set large enough to break the molecular junction on purpose. Some typical modulations are illustrated in FIGS. 6a-6d. They are sine (FIG. 6a), rectangle (FIG. 6b), triangular (FIG. 6c), and sawtooth down (FIG. 6d) type waveforms. The purpose of a sine-type modulation is to introduce continuous and smooth interruption to the molecule contacts. With a rectangle waveform (FIG. 6b), the molecule contacts are under "sharp stretch-hold-sharp release" dynamic modulation. A triangular modulation (FIG. 6c) will stretch and release the molecule junction for a certain distance using a constant stretching speed. The sawtooth down (FIG. 6d) modulation will perform a linear stretch and an immediate sharp release in each cycle. The modulation 39 can also be combination of any number of basic waveforms or repeated hand-drawing cycles as illustrated in FIG. 6e.

Figure 7A:
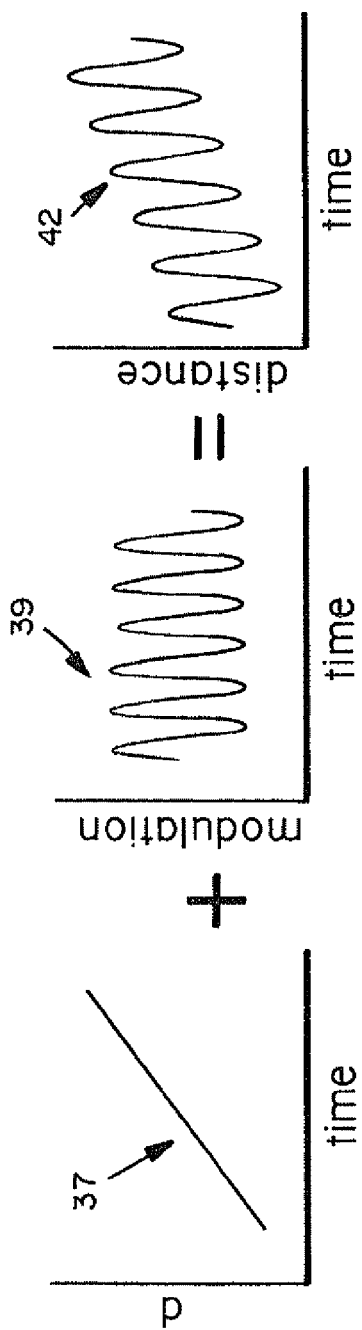
FIGS. 7a-7c are graphs illustrating the production of final stretching behavior curves by summing the basic stretching process with one or multi-level modulation(s).
Figure 7B:
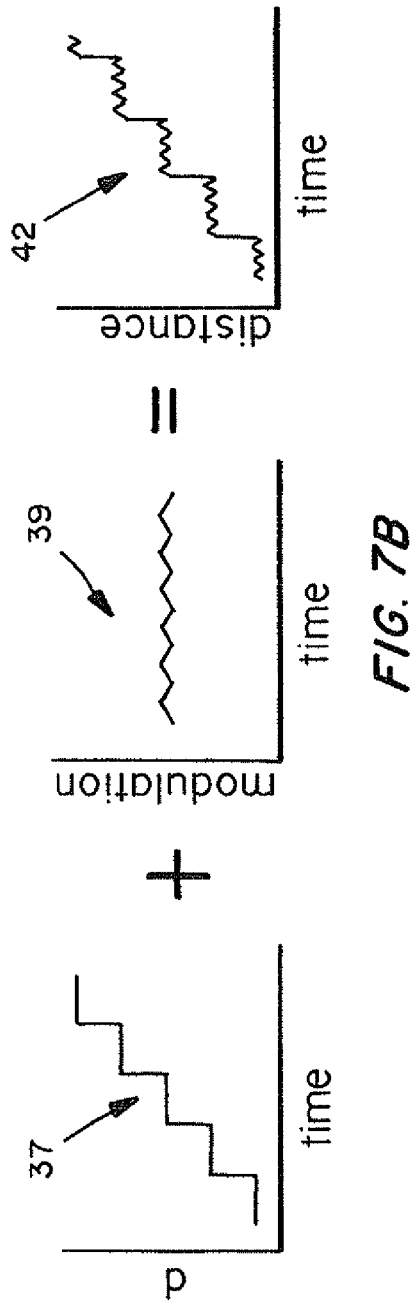

In one embodiment, the real final stretching behavior can only be the basic stretching part 37. In another embodiment, the real final stretching behavior can only be the modulation part 39. In many other cases, the final output stretching behavior is a combination of the basic stretching part and the modulation. FIG. 7 illustrates how a final stretching curve 42 is produced by combining a basic stretch part 37 with a modulation 39. Shown in FIG. 7a is a linear stretching 37 combined with a sine modulation 39 producing a final stretching curve 42. FIG. 7b illustrates the case that a stair-up basic stretching 37 is modulated by a triangular waveform 39. The output final stretching curve 42 has a modulated horizontal part. The purpose of such stretching behavior is first bridging and holding the molecules between electrodes 11-12 using the stair-up stretching, and secondly performing small scale stretching and releasing on the junction. Considering the fact that molecule itself has a relative higher stiffness than the metal electrodes, such small "stretching and releasing" will mainly produce reconstruction or sliding in the bonded electrode atoms and their neighbors.

Figure 7C:
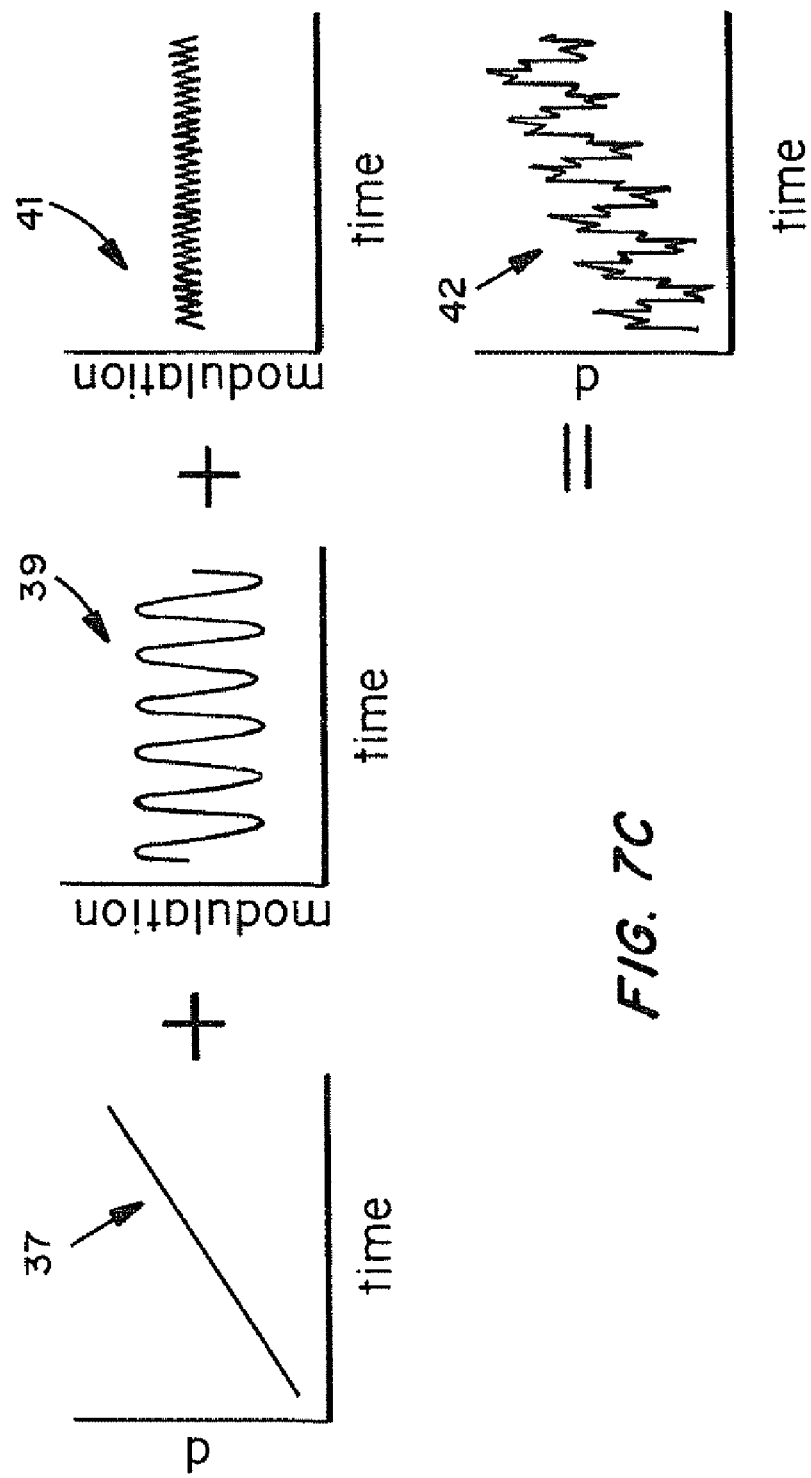

FIG. 7c shows a linear basic stretching part 37 plus two levels of modulation, a sine 39 and a triangular waveform 41, producing more complicated stretching curve 42.

Figure 8A:
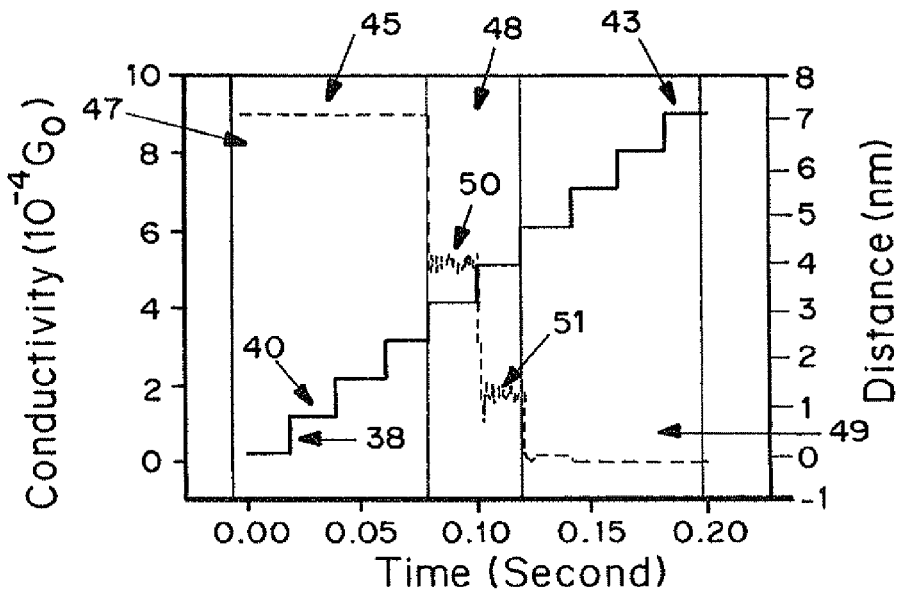
FIGS. 8a-8b are graphs showing simultaneously measured conductivity and stretching distance as function of time elapsed under a stair-up stretching without (FIG. 8a) and with (FIG. 8b) a triangular modulation.

FIG. 8a is a graph showing simultaneously measured conductivity 45 (red line, left y-axis) and stretching distance 43 (black line, right y-axis) versus stretching time (x-axis). The molecule of substance 13 is, in one embodiment, C8dithiol. A constant sample bias of −0.4 V across electrodes 11-12 was used. The stretching behavior 43 in FIG. 8a is a basic stair-up curve as illustrated in FIG. 5b. The sharp stretching distance within each cycle 38 is 0.8 nm, which is close to the full length of C8dithiol molecules. The purpose of choosing this distance is to fully stretch bridged C8dithiol molecules between electrodes 11-12. A 20 mini-second delay 40 was held after each sharp stretch allowing spontaneous relaxation in the molecule junction. The characters of measured conductivity (red line) can be used to distinguish three stages that are cut-off region 47, terrace region 48 and zero conductivity region 49 as separated by dashed lines in FIG. 8a. In the cut-off region 47, the conductivity 45 is a constant value that is determined by the dynamic range of current measurement 17. In order to get better resolutions in the conductivity terrace region 48, the dynamic range of current measurement is set to mainly cover the terrace region 48.

In the conductivity terrace region 48, the conductivity 45 is mainly constant with fluctuations during the holding period 40, showing a terrace. The presence of such conductivity terrace is suggesting that molecules are bridged between the electrodes as a result of the sharp stretching. The fluctuations correspond to the relaxations process in the molecules junction system after sharp stretches. The conductivity may drop from one terrace 50 to another terrace 51 or (from terrace 51) to zero conductivity at the time point of sharp stretching 38.

The first conductivity terrace 50 in FIG. 8a can be attributed to three C8dithiol molecules 13 bridged between electrodes 11-12. The following sharp stretch of 0.8 nm dropped the conductivity to a second terrace 51 that has a ⅓ conductivity value, suggesting that two C8dithiol molecules are broken during this stretch with one molecule left bridged. A third stretch of 0.8 nm broke the last molecule and led to zero conductivity. In the zero conductivity region 49, no molecules are bridged and the electrodes 11-12 are relative far away from each other, producing no measurable current. The fluctuations in the conductivity terraces are important signal to understand the stability and dynamic response of molecule junctions and contact effects.

Figure 8B:
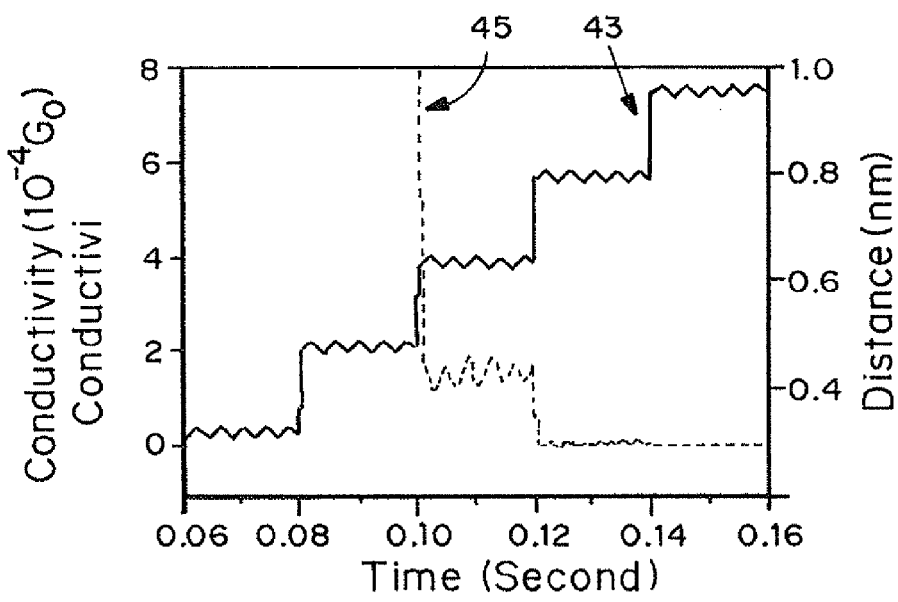

Illustrated in FIG. 8b is a graph showing simultaneously measured conductivity 45 (red line, left y-axis) and stretching distance 43 (black line, right y-axis) versus stretching time. The molecule of substance 13 is again C8dithiol. A constant sample bias of −0.4 V across electrodes 11-12 was used. The stretching behavior 43 in FIG. 8a is as illustrated in FIG. 7b composed of a basic stair-up stretch 37 (FIG. 5b) and a triangular modulation 39 (FIG. 6c). The stretching distance within each cycle 38 is 0.16 nm and the peak-to-peak amplitude of the triangular modulation is 0.017 nm. There are five modulation cycles in the delay period 40 as shown in FIG. 8b. Within each modulation period, the rise-up half of triangular waveform indicates increase of stretching distance. As a response, a decrease was observed in the simultaneously measured conductivity 45, which has been explained as weakening of metal contacts. In the reverse side, a release in the molecule junction resulted to increase of conductivity. The response in conductivity 45 has the same frequency but with a 180 degree phase shift to the triangular modulations 43.

Figure 9:
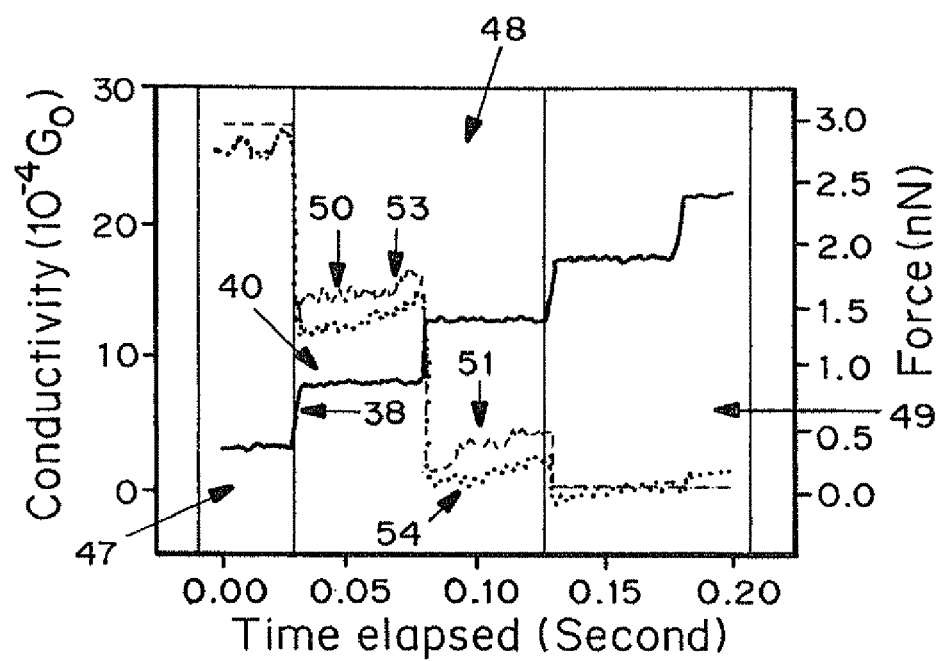
FIG. 9 is a graph showing simultaneously measured molecule conductivity, force and stretching distance from C8dithiol molecule junctions.

FIG. 9 is a graph showing simultaneously measured conductivity (red line, left y-axis), force (blue line, right y-axis) and stretching distance (black line, y-axis not shown) as function of time elapsed from C8dithiol molecule junctions 13. The sample bias across electrodes 11-12 was 0.3V. As seen in the stretching curve (black line), the stretching behavior is described by a stair-up curve or a stretch-and-hold mode as shown in FIG. 5b. According to the conductivity behavior, three different regions, cut-off region 47, terrace region 48 and zero conductivity region 49, are marked by dashed lines in FIG. 9.

In the cut-off region 47, though the conductivity (red line) shows no features, there are significant signals in the force (blue line), suggesting stretching is under processing. Consistent conductivity drop and force jump are observed at the points of sharp stretching. Both the conductivity and the force show terraces in the following delay period. Fluctuations can be observed in both terraces. The broad amplitude distribution of conductivity reveals different bonding sites on the metal electrodes. The force fluctuation period in the first force terrace 53 is the same as that in the conductivity 50. In the second force terrace 54, the force fluctuation period is close to that in the first terrace 53 while the conductivity fluctuation period is significantly reduced in conductivity terrace 51. This may imply that the molecule junctions' geometry switching events are still happening, but their contribution to tunneling current is weakened.

In traditional STM-BJ system, the molecule conductivity is measured only at separated bias points and therefore is lacking a full bias range response. Certain embodiments of the disclosed systems are capable of sweeping bias on bridged molecules to produce full I-V curves in a few stretches. FIG. 10 illustrates an example of tuning the sample bias 15 by programming the output of the voltage source 16 during the stretching process. In one embodiment, the stretching behavior can be described by a stair-up curve (black line, left y-axis) as shown in FIG. 5b. The purpose of using stair-up mode is to bridge target molecules 13 between electrodes 11-12 in quasi-static status so that an I-V curve measurement can be performed within the holding range.

The controller 24 monitors the conductivity during the stretching process and a successful bias sweeping is the one performed only when conductivity terraces are formed. This is often difficult because in order to ensure the accuracy of output speed, i.e., the stretching speed, the positioning control 21 is normally running in a real-time mode, or in another word, hardware control mode, where measuring the conductivity and making real-time judgment is very difficult. In a simple embodiment, the bias is swept regardless of the response of current. There are chances that the bias sweeping is performed within the conductivity terraces.

Figure 10A:
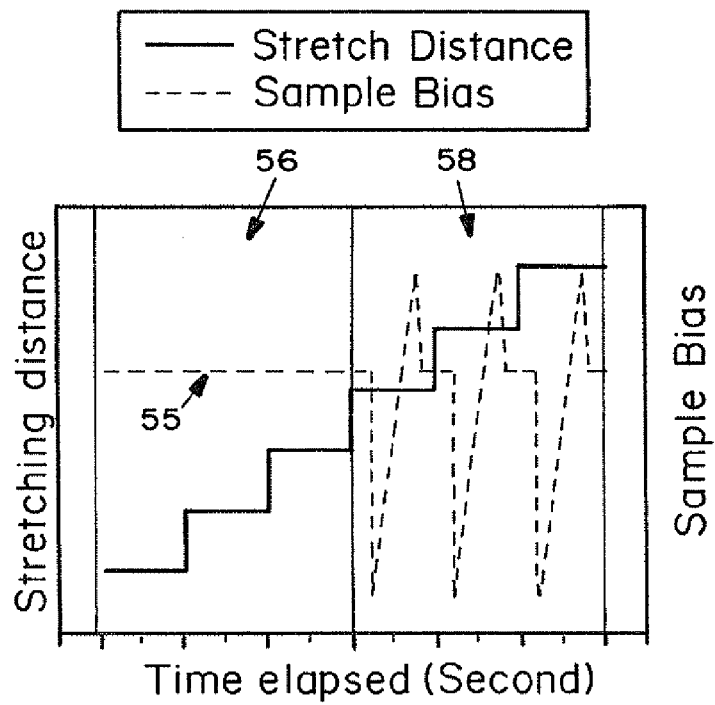
FIGS. 10a-10b illustrate examples of sweeping the sample bias during the stretching process.
Figure 10B:
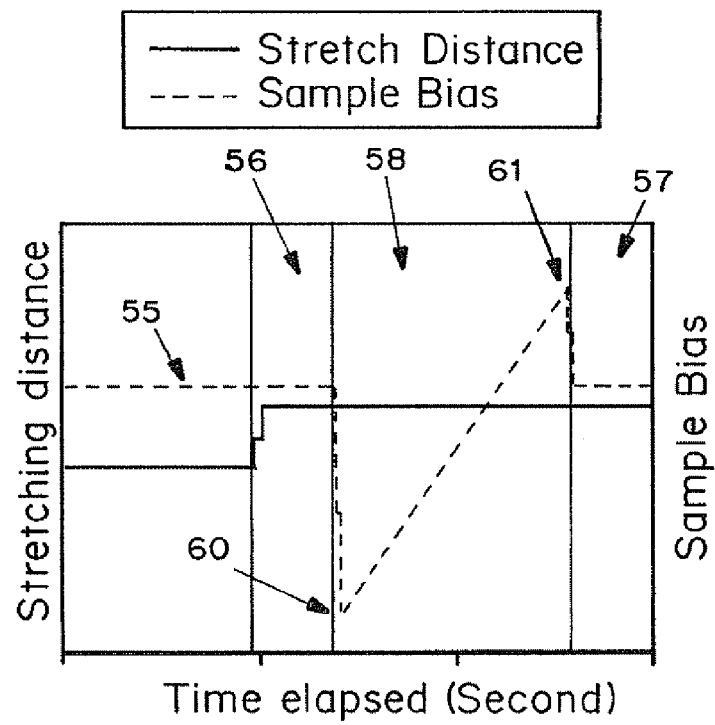

An improved embodiment of I-V measurement is shown in FIG. 10. The sample bias (Olive line, right y-axis) is swept starting from the N-th cycle. The N can be estimated by a statistics analysis of previous measurements. Separated by the N-th sharp stretching, the whole stretching process can be divided into two parts, a no-sweep part 56 and a sweep part 58 as marked by the dashed line in FIG. 10a. An idle sample bias 55 is applied in the no-sweep period to provide initial potential across electrode 11-12 for breakjunction measurement. Even inside one cycle as illustrated in FIG. 10b, the sample bias is not swept at the very beginning of the delay part of the stair-up mode. There is a short delay before 56 and after 57 the sweep part 58, where the idle sample bias 55 is maintained. The purpose of these two delays is to record the conductivity responses under constant sample bias in these two periods, which can be used for judging if there are molecule bridged between electrodes during offline data analysis. The start cycle number N and the pre-delay inside one cycle can be modified during the measurement. In one embodiment, sweeping bias is performed in a defined range specified by a starting voltage 60 and an ending voltage 61. For I-V curve measurement, the sample bias is changed linearly from starting voltage 60 to ending voltage 61. In other embodiments, different sweep behavior can be used to tune the electric field between electrodes 11-12. The stretching curves as defined in FIGS. 5-7 can also be used to tune the sample bias by replacing the stretching distance with sample bias. Combined tuning of stretching behavior and sample bias/electric field can be performed simultaneously to provide more complicated interruption to substances that are bridged between electrodes 11-12.

The disclosed systems and methods are not limited to measuring molecule conductivity and force. A few examples are briefly listed here.

Figure 11A:
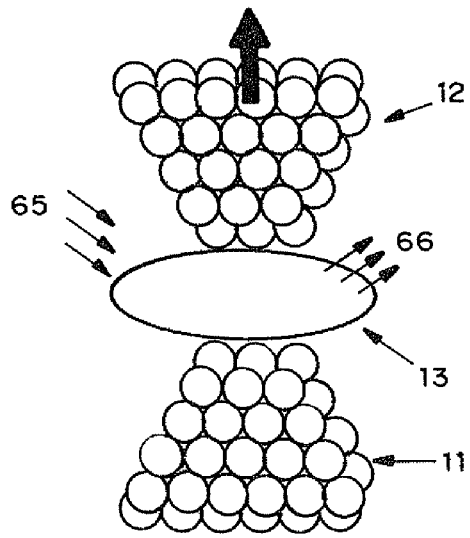
FIGS. 11a-d illustrate additional embodiments for various platforms for measuring properties of substances.

FIG. 11a is an illustration of an apparatus to measure fluorescence on a substance 13 that is inserted between electrodes 11-12. An incident beam 65 is used to illuminate the substance and the fluorescence 66 is collected by a photo detection device. The measurement can be performed during the engaging process and/or the stretching process under predefine engaging/stretching pathways 37, 42 and/or tuned sample bias 15 (electric field).

Figure 11B:
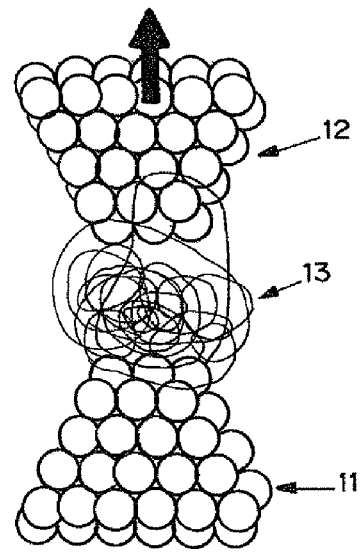

FIG. 11b illustrates a platform for nano-particles testing. In one embodiment, the substance 13 has functional groups that can be chemically bonded to the electrodes 11-12. Breakjunction measurement is conducted under predefined stretching behaviors to study the mechanical properties of interested nano particles or the reaction strength between the function groups on the nanoparticles and those groups on the electrodes.

Figure 11C:
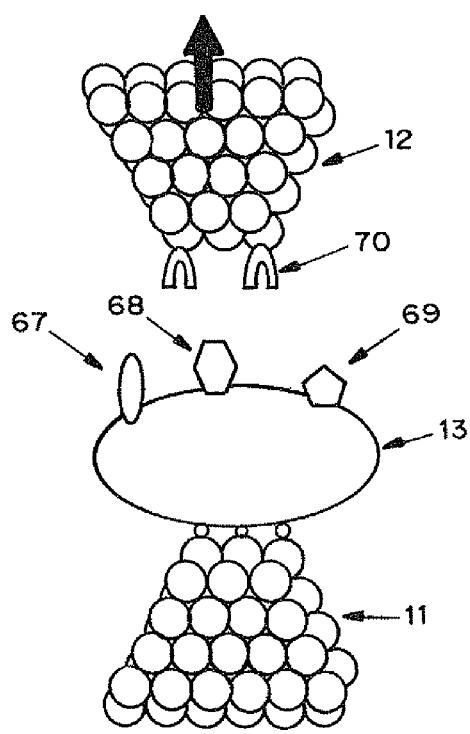

FIG. 11c illustrates a molecule recognition system. In one embodiment, the substance 13 is a biological cell with three different function groups 67, 68, 69. The target cell 13 is immobilized on electrode 11. One of the compensated groups, 70, is used to decorate the electrode 12 that is brought into electrode 11 to recognize the bonding site of, for example, 67. Mechanical properties of the interaction between compensated groups can be investigated under modulated stretching processes and/or electric fields.

Figure 11D:
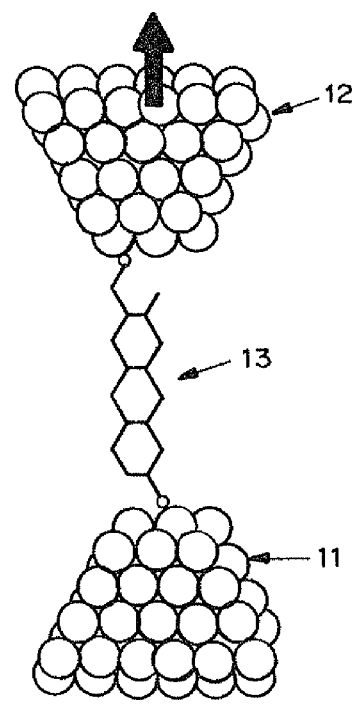

FIG. 11d shows a test platform for folding and unfolding of substance, for example, DNA and proteins.

While one or more embodiments of the present invention have been illustrated in detail, the skilled artisan will appreciate that modifications and adaptations to those embodiments may be made without departing from the scope of the present invention as set forth in the following claims.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A method of measuring the conductivity of a molecule or substance, comprising:

applying a sample bias across a first and a second electrode bridged by the molecule or substance;

separating the first electrode away from the second electrode under a defined stretching behavior, wherein the stretching behavior is described by a non-linear stretching distance-versus-time curve; and measuring conductivity, stretching distance, force or combination thereof while separating the first electrode away from the second electrode.

2. The method of claim 1, wherein the stretching behavior is described as a pathway from distance "a" to distance "b" as function of time, where "a" value is smaller than "b" value.

3. The method of claim 2, wherein the stretching distance-versus-time curve is a stair-up curve.

4. The method of claim 2, wherein the stretching distance-versus-time curve is a parabolic curve.

5. The method of claim 2, wherein the stretching distance-versus-time curve is a hand-drawing curve.

6. The method of claim 2, wherein the stretching distance-versus-time curve is a periodic modulation.

7. The method of claim 2, wherein the stretching distance-versus-time curve is a basic stretching curve plus a periodic or irregular modulation.

8. The method of claim 7, wherein the modulation is a sine waveform.

9. The method of claim 7, wherein the modulation is a rectangle waveform.

10. The method of claim 7, wherein the modulation is a triangular waveform.

11. The method of claim 7, wherein the modulation is a sawtooth up/down waveform.

12. The method of claim 7, wherein the modulation is a periodic hand-drawing waveform.

13. The method of claim 7, wherein the modulation is a combination of any periodic or irregular waveforms.

14. A method of characterizing a molecule or substance, comprising:

applying a sample bias across a first and a second electrode bridged by a single molecule of the substance;

tuning the sample bias and measuring conductivity while separating the first electrode from the second electrode under a defined stretching behavior.

15. The method of claim 14, wherein the sample bias is tuned from voltage 1 to voltage 2 described as a voltage-versus-time curve.

16. The method of claim 15, wherein the sample bias is swept linearly from voltage 1 to voltage 2.

17. The method of claim 15, wherein the sample bias is swept from voltage 1 to voltage 2 only from the N th cycle in the stretching behavior.

18. The method of claim 17, wherein the N can be any number from zero to the maximum number of cycles in the stretching behavior.

19. The method of claim 15, wherein the sample bias is swept from voltage 1 to voltage 2 after a delay inside one cycle.

20. The method of claim 19, wherein the delay can be any value between 0 and 50% of the whole cycle duration.

21. A system comprising a first and second probe electrode, wherein the first probe electrode is fixed in position and wherein the second probe electrode is mounted on a precise positioning stage controlled by a programmable positioning control unit;

a voltage source electrically coupled to the first and second probe electrodes;

a current, conductivity, and force measurement device electrically coupled to the voltage source;

a positioning measurement device for determining the relative position of the second probe electrode electrically coupled to the positioning control unit;

a controller electrically coupled to the voltage source, positioning control unit, the current, conductivity, and force measurement devices, wherein the controller receives the measured conductivity, force, and position information and defines output of the positioning control unit in pre-defined pathways and determines a sample bias from the voltage source across the first and second probe electrodes.

* * * * *